United States Patent [19]

Nokajima et al.

[11] Patent Number: 4,937,929

[45] Date of Patent: Jul. 3, 1990

[54] METHOD AND APPARATUS FOR TRANSPORTING VEHICLE BODIES, AND VEHICLE ASSEMBLING SYSTEM

[75] Inventors: Kunio Nokajima; Mituaki Hirasaka, both of Saitama; Yasuhiro Yamamoto, Tokyo; Yuji Ikeda, Saitama; Masayasu Arakawa, Saitama; Yoshimasa Oota, Saitama, all of Japan

[73] Assignee: Honda Giken Kogyo Kabushiki Kaisha, Tokyo, Japan

[21] Appl. No.: 100,383

[22] Filed: Sep. 24, 1987

[30] Foreign Application Priority Data

Sep. 25, 1986 [JP] Japan .................. 61-224821
Apr. 1, 1987 [JP] Japan .................. 62-79891
Apr. 1, 1987 [JP] Japan .................. 62-79892

[51] Int. Cl.⁵ ........................................ B23P 21/00
[52] U.S. Cl. ........................... 29/430; 29/799; 29/824
[58] Field of Search ............... 29/429, 430, 822–824, 29/799, 787

[56] References Cited

U.S. PATENT DOCUMENTS

| 4,589,199 | 5/1986 | Ohtaki et al. ............ 29/799 X |
| 4,776,084 | 10/1988 | Naruse et al. ............ 29/799 X |
| 4,776,085 | 10/1988 | Shiiba ........................ 29/824 |

FOREIGN PATENT DOCUMENTS

| 57-66833 | 4/1982 | Japan . |
| 61-21869 | 5/1986 | Japan . |
| 61-21871 | 5/1986 | Japan . |
| 84/00627 | 12/1984 | PCT Int'l Appl. . |
| 795896 | 6/1958 | United Kingdom . |
| 829651 | 3/1960 | United Kingdom . |
| 837852 | 6/1960 | United Kingdom . |
| 1367119 | 9/1974 | United Kingdom . |
| 2124169 | 2/1984 | United Kingdom . |
| 2134875 | 8/1984 | United Kingdom . |

Primary Examiner—Timothy V. Eley
Attorney, Agent, or Firm—Lyon & Lyon

[57] ABSTRACT

In a vehicle assembling line in which parts are assembled to a vehicle body while the body is passed through each of working stations by a plurality of transporting means, the vehicle body is positioned and supported by a pallet and transported by each of the transporting means, wherein transferring of the body between the transporting means is carried out through the pallet. A transporting path, on which a self-travel carriage as the transporting means travels, is laid within a pit concavely provided below a floor plate of a working floor. Arranged above the floor plate are a carriage frame, a lift table and a turn rest for supporting the pallet, which constitute an upper portion of the self-travel carriage. The transporting path is disposed substantially along the assembling line from its starting point to its terminal point, and an automated assembling zone and a manually assembling zone are coexistently disposed along the assembling line. An automatic machine is disposed in a working station of the automated assembling zone for advancing and retreating movement, and there is provided means for positioning and fixing the self-travel carriage together with the pallet in such working station. An overhead conveyor for transporting the self-travel carriage separated from the pallet in a hung manner is used as one of the transporting means.

21 Claims, 14 Drawing Sheets

FIG.5

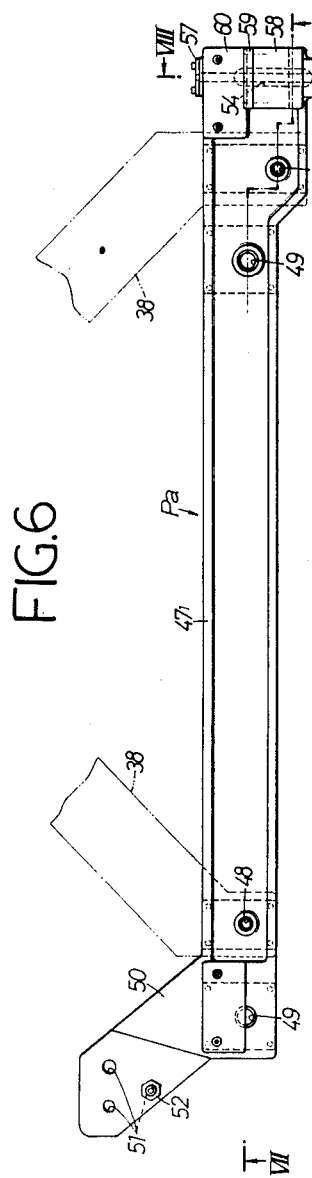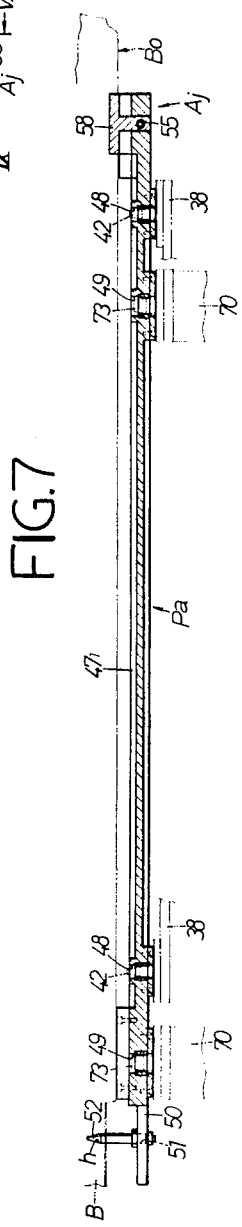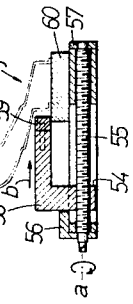

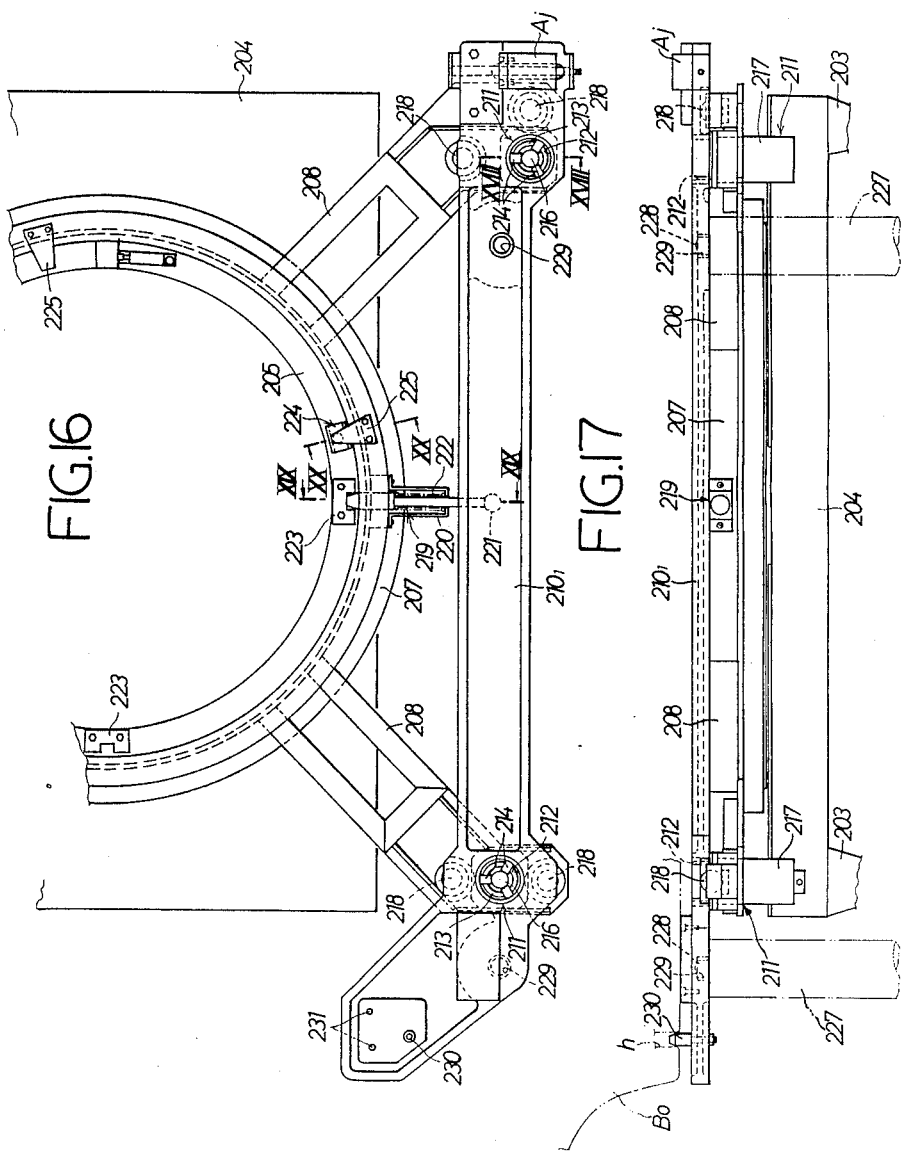

METHOD AND APPARATUS FOR TRANSPORTING VEHICLE BODIES, AND VEHICLE ASSEMBLING SYSTEM

BACKGROUND OF THE INVENTION

1. Field of the Invention

The prevent invention relates to a method and apparatus for transporting vehicle bodies in a vehicle assembling line and further to a vehicle assembling system equipped with such transporting apparatus.

2. Description of the Prior Art

Vehicle assembling lines have been known, wherein many types of transporting means such as a floor type including a carriage and an overhead type including a hanger are arranged for every working section, so that various parts may be assembled to a body of a vehicle in these working sections while the body is transported and passed therethrough, for example, as disclosed in Japanese patent application Laid open No. 21871/86.

However, in carrying out the assembling in a certain Working section by use of an automatic machine such as a robot in such assembling lines, it is necessary to position the body transported by the transporting means relative to the automatic machine. For this reason, basic holes have been provided in the body, and positioning pins adapted to engage the basic holes have been mounted on the transporting means, so that the body could be positioned relative to the transporting means to provide a given positional relationship between the body and the automatic machine by stopping the transporting means in a predetermined position relative to the automatic machine.

In the above system, the following problem is encountered: the positioning pins of each of the transporting means must be inserted and withdrawn for each shifting of the body from one transporting means to another transporting means, and repetition of such insertion and withdrawing of the pins causes the basic holes to be deformed, resulting in reduced positioning accuracy, with a tendency for the body to be damaged.

Further, there is known transporting means which uses a self-travel carriage self travellable on a track laid on a Working floor (see Japanese patent application Laid-open No. 66833/82. Such arrangement is accompanied by the following problems:

(1) Attention must always be given that there is no obstacle on the track and in the vicinity thereof to permit the normally smooth travel of the self travel carriage, resulting in increased restrictions in providing a layout for an assembling line:

(2) The track occupies a wide space over the floor surface in a working site;

(3) Because the self travel carriage travels on the floor surface in the working site, an increased cost of equipment is required for extra safety for workers; and (4) The track is a hindrance in carrying out working such as assembling of a body on the self-travel carriage from the below.

Furthermore, in coexistence with an automated assembling zone employing a number of automatic machines such as robots and a manually assembling zone in the above-described assembling line, an assembling system for use in such assembling line is known from Japanese patent application Laid-open No. 21869/86, wherein the assembling line is largely divided into three sections: a first half, a latter half and an end section, with a cart type conveyor being used in the first section to concentratively arrange automated asembling steps therein, a trolley type or power and free type conveyor being used in the second section to concentratively arrange manually assembling steps, and a tact carrying conveyor being used in the end section to arrange automated assembling steps following the manually assembling steps. However, such prior art assembling system is accompanied by the following problems:

(1) Three different types of body-transporting conveyors are required while the body is transported along the assembling line from its starting point to its terminal point, resulting in not only an increased cost of equipment but also reduced freedom in rearrangement of the assembling line;

(2) When a trouble is generated in the automatic machine such as robot problems in the automated assembling zone, it is impossible to deal with the trouble until the body has been passed through the automated asembling zone and hence, a preparative manually assembling zone must be specially provided therefor;

(3) The body is liable to be damaged, when it is transferred onto the different transporting means.

SUMMARY OF THE INVENTION

It is therefore an object of the present invention to provide a method and apparatus for transporting vehicle bodies, and a vehicle assembling system equipped with such transporting apparatus, wherein &he above disadvantages are overcome.

To accomplish the above object, according to a first aspect of the present invention, there is provided a method for transporting vehicle bodies, comprising the steps of placing a body on a pallet in a relatively positioned manner, and transporting the body while using a plurality of transporting means arranged in a vehicle assembling line with the pallet interposed therebetween, so that the transferring of the body from one transporting means onto the other transporting means can be achieved through the pallet.

Further, according to a second aspect of the present invention, there is provided an apparatus for transporting vehicle bodies, comprising a pallet which is constructed to be placed in a located relation to a plurality of transporting means disposed in a vehicle assembling line and which is adapted to be loaded with a vehicle body, and means provided on the pallet and in the body for positioning the body and the pallet relative to each other.

With the above features, the body is transported through the vehicle assembling line together with the pallet positioned relative to the body, and transferring of the body from one transporting means onto the other transporting means is carried out through the pallet. Therefore, the positioning of the body relative to each of the transporting means in transferring thereof is extremely facilitated, and the body cannot be damaged. Further, the pallet can be formed of a thick plate in view of durability, and this makes it possible to maintain good body positioning accuracy, even if the transferring of the body between the transporting means is effected repeatedly.

In addition, according to a third aspect of the present invention, there is provided an apparatus for transporting vehicle bodies, comprising a pit concavely provided in a working floor, a transporting path laid within the pit, a self travel carriage self travellable on the transporting path, and a floor plate covering an upper opened face of the pit and having slits opened therein along the transporting path, wherein the self travel carriage is travellably supported on the tranporting path and comprises a carriage frame having an upper portion projecting above the floor plate through the slits, travel drive means mounted between the carriage frame and the transporting path for driving the carriage frame to travel along the transporting path, a lift table liftably supported on the upper portion of the carriage frame, and a turn rest turnably supported on the lift table for supporting the body.

With such construction, the transporting path is laid in the pit below the floor plate rather than being located on the floor plate of the working floor and therefore, the layout of the transporting path can be achieved with a decreased influence of obstacles on the floor. Also, since the travel-drive means for the self-travel carriage is located within the pit, foreign matter cannot penetrate the travel-drive means, or dust or the like cannot be deposited on the travel-drive means, making it possible to provide the smooth and light self-travelling of the self-travel carriage at all times.

Further, in carrying out working such as assembling, for a transported object on the self-travel carriage, the transporting path is not a hindrance and hence, such working is easy to conduct. Particularly, in carrying out working for the transported object from below, its workability is further improved and moreover, a high degree of safety is assured.

Additionally, according to a fourth aspect of the present invention, there is provided a vehicle assembling system comprising: a transporting path disposed substantially along an assembling line from its starting point to its termninal point; an automated assembling zone and a manually assembling zone coexistently disposed along the assembling line; an automatic machine, such as a robot, disposed in each of the automated assembling stations in the automated assembling zone for advacing and retreating movement; a self-travel carriage self-travellable along the transporting path and including a liftable and rotatable turn rest; a pallet releasably connected on the turn rest and adapted to support a vehicle body on an upper surface thereof in an integrally positioned manner; body-positioning means for positioning and fixing the self-travel carriage on each of the automated assembling stations together with the pallet; and an overhead conveyor mounted on the assembling line for transporting the body separated from the self-travel carriage in a hung manner together with the pallet over a partial section of the assembling line.

With such arrangement, the body can be transported on the transporting path mounted substantially along an assembling line from its starting point to its termninal point, so that parts for the body excluding bottom parts can be assembled to the body. In addition, only in assembling the bottom parts, the body is transported in a hung manner by the overhead conveyor mounted over the partial section of the assembling line and therefore, the body transporting means in the assembling line is considerably simplified and this makes it possible to substantially reduce the cost of equipment.

In addition, it is possible to freely layout the automated assembling zone and the manually assembling zone along the assembling line, as required, and also to provide a substantially improved efficiency of the whole assembling operation, and moreover, it is possible to increase the freedom of rearrangement of steps in the assembling line.

Further, when trouble is generated in the automatic machine, such as problems with the robot, the working by the automatic machine can be replaced by manual working, leading to no hindrance to such Working and moreover to a facilitated maintenance of the automatic machine.

Yet further, since the body is positioned on the self-travel carriage or the overhead conveyor normally through pallet not only the body can the body not be damaged in the transporting thereof in a positioned manner, but also accurate positioning of the body is insured at the assembling of parts, making it possible to assemble parts to the body with a higher accuracy.

The above and other objects, features and advantages of the invention ill become apparent from reading of the following detailed description of the preferred embodiments taken in conjunction with the accompanying drawings.

BRIEF DESCRIPTION OF THE DRAWINGS

Drawings illustrating several embodiments of the present invention will be briefly described below.

FIGS. 1 to 13 illustrate a first embodiment of the present invention, wherein

FIG. 1 is a perspective exploded view of a self-travel carriage and a pallet;

FIG. 2 is a side view of the pallet on the self-travel carriage as being loaded with a vehicle body;

FIG. 3 is a back view of the self-travel carriage and the pallet, taken along a line III—III in FIG. 2;

FIG. 4 is a plan view of the pallet, the self-travel carriage and body-positioning means;

FIG. 5 is a back view of the pallet, the self-travel carriage and the body-positioning means, taken along a line V—V in FIG. 4;

FIG. 6 is a plan view of a pallet half;

FIG. 7 is a vertical sectional view of the pallet half, taken along a line VII—VII in FIG. 6;

FIG. 8 is a cross sectional view of the pallet half, taken along a line VIII—VIII in FIG. 6;

FIG. 9 is a perspective exploded view of a body-aligning mechanism, taken in a direction indicated by an arrow IX in FIG. 6;

FIG. 10 is a schematic plan view of the whole line for assembling parts to a body;

FIG. 11 is a perspective view of a body lift position taken in a direction indicated by an arrow XI in FIG. 10;

FIG. 12 is a perspective view of a different level transporting-rail body-transferring position taken in a direction indicated by an arrow XII in FIG. 10; and FIG. 13 is a perspective view of a rear-seat assembling section taken in a direction indicated by an arrow XIII in FIG. 10; and FIGS. 14 to 20 illustrate a second embodiment of the present invention, wherein FIG. 14 is a plan view of a vehicle body positioned on a carriage with a pallet interposed therebetween;

FIG. 15 is a front view similar to FIG. 14;

FIG. 16 is an enlarged view of details of the pallet and the carriage; and

FIG. 17 is a side view of the details shown in FIG. 16;

FIGS. 18 to 20 are sectional views taken along lines XVIII—XVIII, XIX—XIX and XX—XX In FIG. 16, respectively.

DESCRIPTION OF THE PREFERRED EMBODIMENTS

The present invention will now be described by way of several embodiments with reference to the accompanying drawings.

As used herein, "front and rear" and "left and right" in the following description are referred with respect to a direction of advance of an assembling line Li.

FIGS. 1 to 13 illustrate a first embodiment of the present invention.

Figure 1:
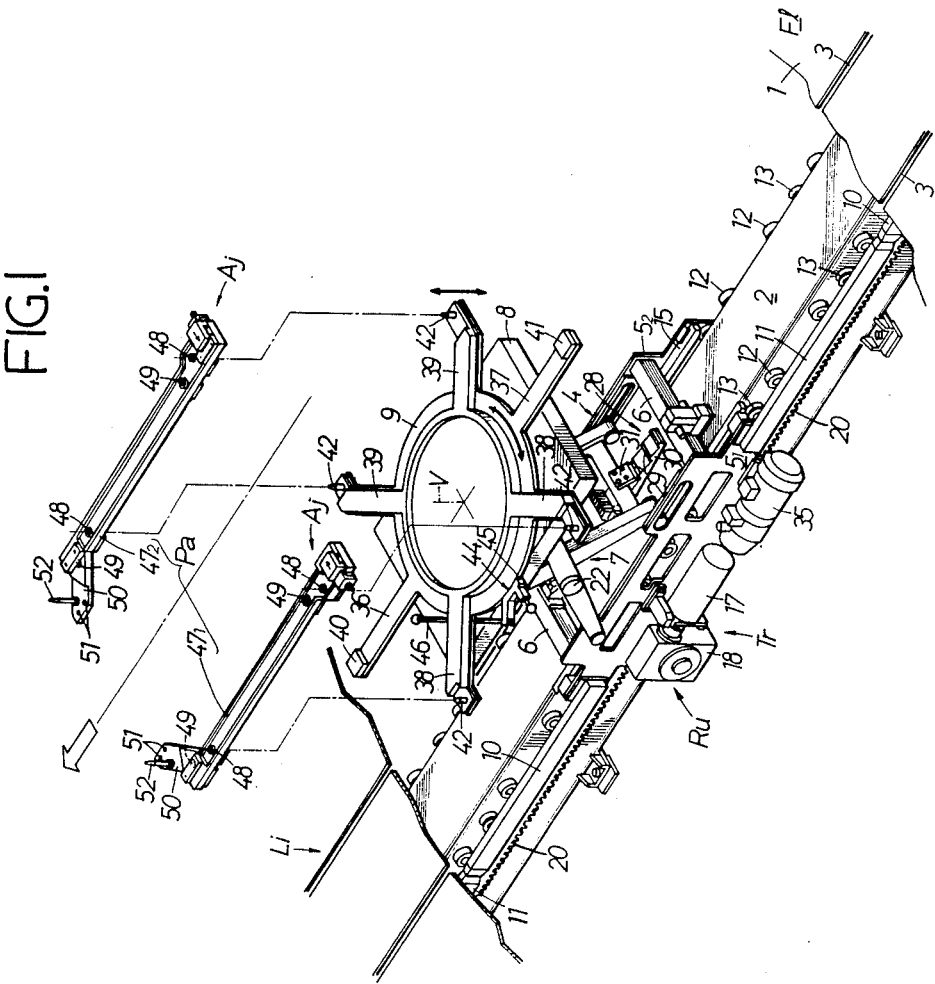
Figure 2:
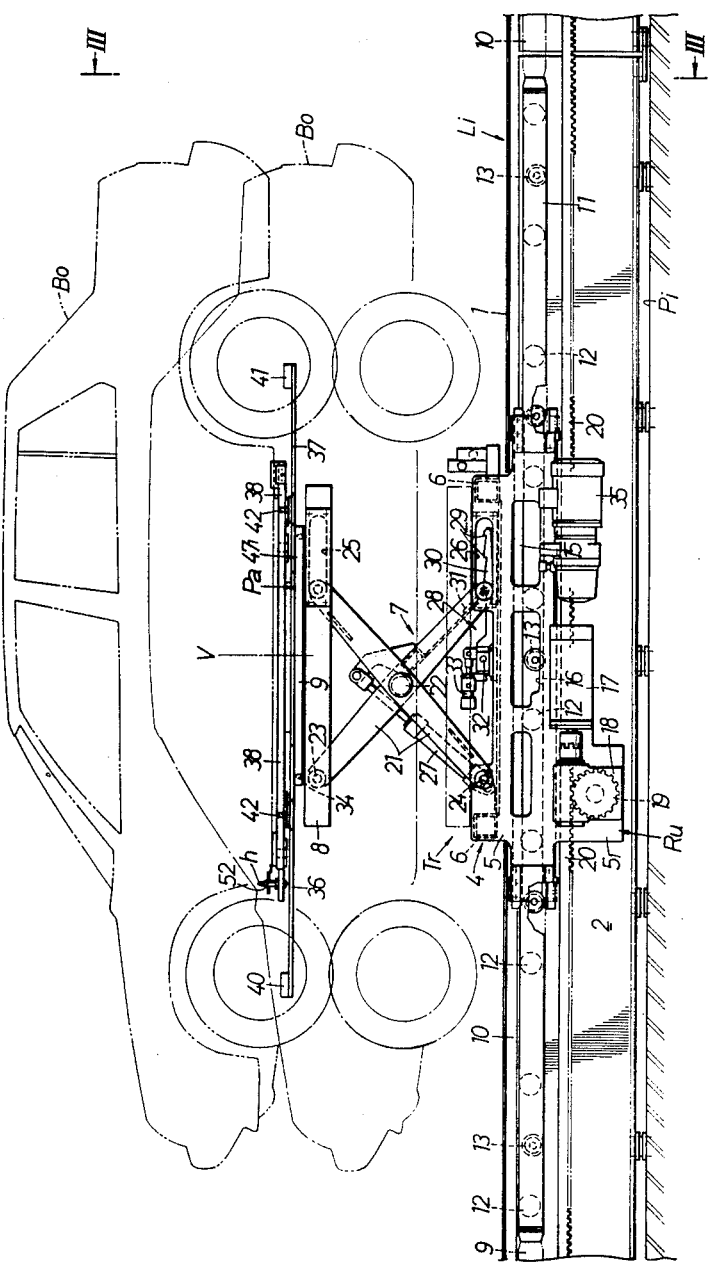
Figure 3:
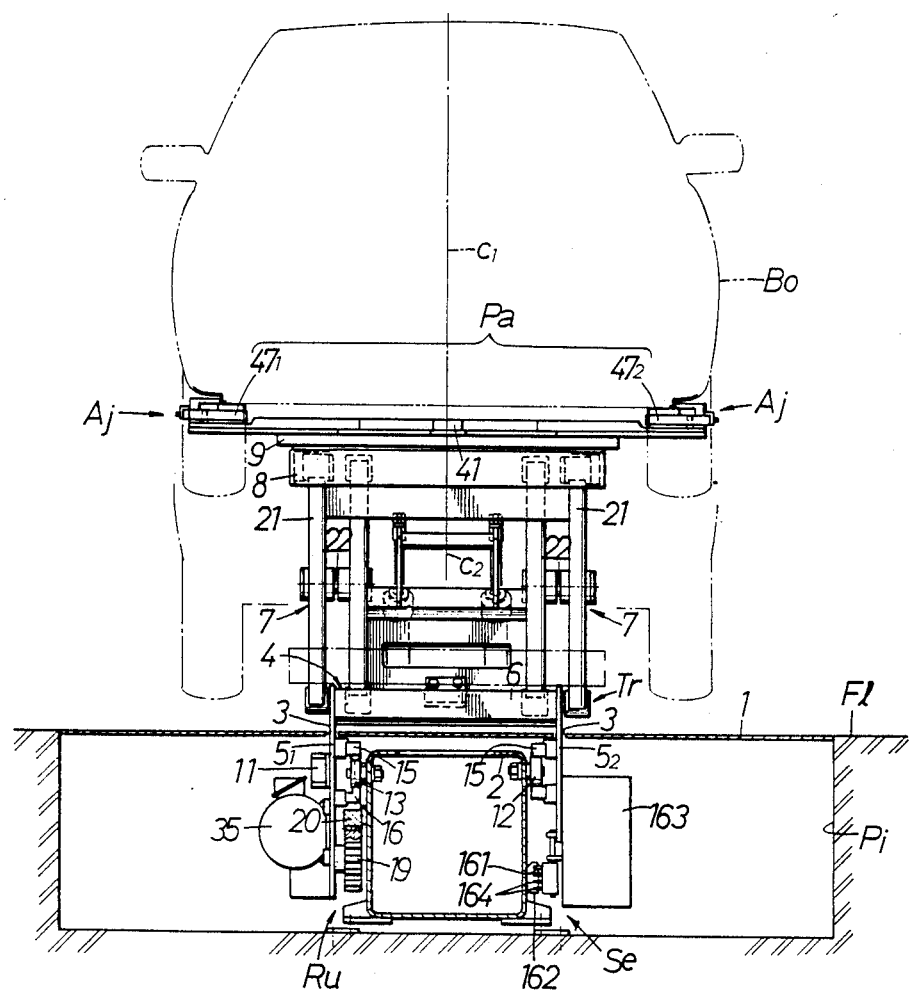

Referring to FIGS. 1 to 3, a transporting pit Pi is provided in a working floor F in a factory along the line Li for assembling a vehicle body Bo, and a floor plate 1 flush with the working floor F is laid on an upper face of an opening of the transporting pit Pi.

As clearly shown in FIG. 3, a transporting path 2, which is formed of a square column material having a square cross-section and traverses within the transporting pit Pi, is placed in the transporting path Pi at the widthwise middle thereof, and a plurality of self-travel carriages Tr are placed on and astride the transporting path 2 for self-travelling movement at given distances on the transporting path 2. The self-travel carriage Tr has a carriage frame 4 which includes a pair of left and right side plates $5_1$ and $5_2$ vertically arranged in parallel to each other, and cross members 6 integrally connecting the side plates $5_1$ and $5_2$ at their upper front and rear portions. Upper portions of the pair of the side plates $5_1$ and $5_2$ project above the floor plate 1 through slits 3 made in the floor plate 1, and a substantially horizontal lift table 8 is liftably mounted on the upper portions of the side plates $5_1$ and $5_2$ with a lifting mechanism 7 interposed therebetween. A turn rest 9 is mounted on the lift table 8 for substantially horizontally turning movement about a vertical central axis V, so that a vehicle body Bo may be positioned and supported on the turn rest 9 through a pallet Pa which will be described hereinafter.

Each of the plurality of the self-travel carriages Tr—self-travellably mounted on and astride the transporting path 2 has front and rear horizontally and longitudinally extending bar-like spacer members 10 and 11 secured respectively to front and rear portions of the left side plate $5_1$ thereof, and respectively mated to the leading ends of the spacer members 10 and 11 of one self-travel carriage are the rear spacer member 11 of the proceeding self-travel carriage Tr and the front spacer member 10 secured to the succeeding self-travel carriage Tr, hereby the plurality of the self-travel carriages Tr—are maintained at a given distance spaced apart from one another.

A large number of rolling rollers 12—are rotatably supported at longitudinally spaced-apart distances on the upper portions of the left and right side surfaces of the transporting path 2, and a plurality of V-grooved rolling rollers 13—are each rotatably supported in place between the adjacent rolling rollers 12. Travel rails 15 are mounted on the left and right side plates $5_1$ and $5_2$ of the self-travel carriage Tr and travellably engaged to the plurality of the rolling rollers 12—, while travel rails 16 mounted on the left and right side plates 51 and 52 are travellably engaged to the plurality of the V grooved rolling rollers 13—(see FIG. 3). The travel rails 15 and 16 are vertically positioned so that the travel rails 15 are kept from interferring with the v-grooved rolling rollers 13 —and the travel rails 16 are kept from interfering with the rolling rollers 12—.

As shown in FIGS. 1 to 3, a travel-drive motor 17 is supported on the left side plate $5_1$ of the carriage frame 4 of the self-travel carriage Tr, and a pinion 19 is secured to an output end of a decelerator 8 connected to the travel-drive motor 17. The pinion 19 is meshed with a rack 20 provided on the left side face of the transporting path 2 over the entire length thereof. Thus, hen the travel-drive motor 17 is driven, the pinion 19 can be rolled on the rack 20 to cause the self-travel carriage Tr to self-travel along the transporting path 2.

The travel-drive motor 17, the decelerator 18, the pinion 19 and the rack 20 constitute travel-drive means Ru for the self-travel carriage Tr.

As seen in FIGS. 1 to 3, the upper portions of the left and right side plates $5_1$ and $5_2$ of the carriage frame 4 project upwardly through the slits 3 in the floor plate 1 and the lifting mechanism 7 is mounted on such upper portions for raising and lowering the body Bo, as described above. The lifting mechanism 7 includes a pair of cross-links 21 pivotaly supported at their intermediate portions by pivots 22. The cross-links 21 are pivoted at their front ends respectively at 23 and 24 on the front portions of the left and right side faces of the lift table 8 and the front portions of the left and right side plates $5_1$ and $5_2$ of the carriage frame 4 (see FIG. 2), and are slidably engaged at their rear ends in elongated holes 25 made in left and right portions of the liftt table 8 and elongated holes 26 made in the rear portions of the left and right side plates $5_1$ and $5_2$ of the carriage frame 4 (see FIG. 2). A lifting cylinder 27 is connected between the cross member 6 of the carriage frame 4 and the cross-link 21, so that the expanding and retracting operations of the lifting cylinder 27 enable the lift table 8 to be raised and lowered in a horizontally held state. As clearly shown in FIGS. 1 and 2, a locking mechanism 28 for the lift table 8 is mounted between the carriage frame 4 and the cross-link 21. The mechanism 28 is comprised, as shown in FIGS. 1 and 2, of a locking piece 30 mounted on the carriage frame 4 and having a plurality of locking serrated teeth 29—, a claw piece 21 (FIG. 1) mounted on the rear portion of the cross-link 21 and selectively engageable with the plurality of the locking teeth 29—and a hydraulic cylinder 33 for driving the locking piece 30 for vertically sWinging movement about a pivot 32 (FIG. 2). Thus, by fixing the locking piece 30 in a locked position as shown in FIGS. i and 2 and then selectively bringing the claw piece 31 of the cross-link 21 into engagement with the locking teeth 29, the lift table 8 can be prevented from being lowered. If the locking piece 30 is swung downwardly by the operation of the hydraulic cylinder 33, the claw piece 31 is released from the locking teeth 29—, so that the lift table 8 can be lowered.

As seen in FIGS. 1 to 5, the above-described turn rest 9 for supporting and turning the body Bo is supported on the lift table with ball bearings 34 (FIG. 2) interposed therebetween for freely turning movement about the vertical central axis V.

A drive unit 35 for turnably driving the turn rest 9 and for providing the expansion and retraction of the hydraulic cylinder 27 of the lift mechanism 7 is supported on the left side plate $5_1$ of the carriage frame 4 of the self-travel carriage Tr and operatively connected with the turn rest 9 by a conventionally known interlocking mechanism.

As shown in FIG. 3, an electric supply Se is mounted between the right, outer side face of the transporting path 2 and the right side plate $5_2$ of the carriage frame 4.

The electric supply Se is comprised of a current feeding trolley 162 including a large number of feeders 161—mounted on the right, outer side face of the transporting path 2 over the entire length thereof, and a current collector 64 added to a control box 163 secured to the right side plate 52 of the carriage frame 4 in slidable contact with the feeders 161 of the current-feeding trolley 162, so that anywhere the self-travel carriage Tr is located on the transporting path 2, a current may be supplied from the feeding trolley 162 through the current collector 164 to the control box 163.

The electirc supply is conventionally known (under a trade name of National High Trolleyl) and hence, the detailed description thereof is omitted.

As clearly shown in FIG. 1, two front and rear body-supporting arms 36 and 37 are mounted substantially horizontally on the turn rest 9 to extend diametrically, and pairs of left and right pallet-supporting arms 38 and 39 are provided on the turn rest 9 to project substantially horizontally in radial directions respectively at the left and right sides of the supporting arms 36 and 37 in a sandwich relation to the latter. Seats 40 and 41 for receiving the bottom surface of the body Bo are mounted on leading ends of the front and rear body supporting arms 36 and 37, respectively, and basic pins 42—are mounted on the leading ends of the left and right pallet-supporting arms 38 and 39 to project upwardly therefrom. A body-positioning pallet Pa which will be described hereinafter is detachably supported on the pallet-supporting arms 38 and 39.

A brake 44 is mounted on an outer periphery of the turn rest 9 for braking the rotation of the turn rest 9. The brake 44 comprises a brake piece 45 adapted to be urged against the outer peripheral surface of the turn rest 9, and a brake arm 46 for operating the brake piece 45.

The body-positioning pallet Pa is comprised of a pair of pallet halves $47_1$ and $47_{22}$, one $47_1$ of which is supported on the pallet-supporting arms 38 and the other pallet half $47_2$ is supported on the pallet-supporting arms 39.

The air of the pallet halves $47_1$ and $47_2$ have essentially the same structure, but of opposite hand, and hence, the structure of the one pallet half $47_1$ will be described below, primarily with reference to FIGS. 6 to 9. The pallet half $47_1$ is shaped into an elongated rectangle and has basic-pin holes 48 perforated in opposite ends thereof, in which the basic pins 42 are inserted, and holes 49 for pins for positioning the pallet pa in each of assembling stations are perforated therein in the vicinity of the basic-pin holes 48. A bent extension 50 is integrally provided on one end (left end as viewed in FIGS. 6 and 7) of the pallet half $47_1$. Three body-positioning pin holes 51 are made in the bent extension 50, and a single body-positioning pin 52 is fixedly fitted in one of the holes 51 to extend upwardly, so that when a body Bo is to be positioned and fixed on the pallet pa, the pin 52 may be inserted into a pin hole h made in the bottom surface of the body Bo. In addition, a body-aligning mechanism Aj is provided on the other end (right end as viewed in FIGS. 6 and 7) of the pallet half $47_1$. The body-aligning mechanism Aj is shown in detail in FIGS. 8 and 9. An elongated hole 54 is perforated in the rear end of the pallet half $47_1$ to extend perpendicularly to the longitudinal direction of the latter, and a threaded bar 55 is rotatably passed through such rear end along the elongated hole 54 and received at its opposite ends against axial movement by bearing members 56 and 57 secured to the opposite side faces of the pallet half $47_1$. A slider 58 is slidably fitted in the elongated hole 54 by the threaded bar 55 threadedly inserted therein. A body-urging member 59 is secured to a leading end of the slider 58 and is slidable on a body bearer 60 secured to the end of the pallet half $47_1$. When a body Bo is placed on the pallet Pa consisting of the pair of pallet halves $47_1$ and $47_2$ as shown by a broken line in FIGS. 2 and 3, if the threaded bars 5 of the body-aligning mechanisms Aj each provided on the one end (right end as viewed in FIG. 2 and 3) of each of the pallet halves $47_1$ and $47_2$ are rotated for adjustment in a direction indicated by an arrow a in FIG. 8, the sliders 58 are moved in a direction indicated by an arrow b, and the body-urging members 59 at the leading ends of the sliders 58 urge and clamp a side sill at the lower portion of the body Bo from opposite sides, whereby the body Bo can be securely positioned in a stationary condition on the pallet Pa by cooperation with the body-positioning pins 52 in such a manner that a longitudinally central axis $c_1$ of the body Bo may be aligned with a longitudinally central axis $c_2$ of the self-travel carriage Tr.

Figure 4:
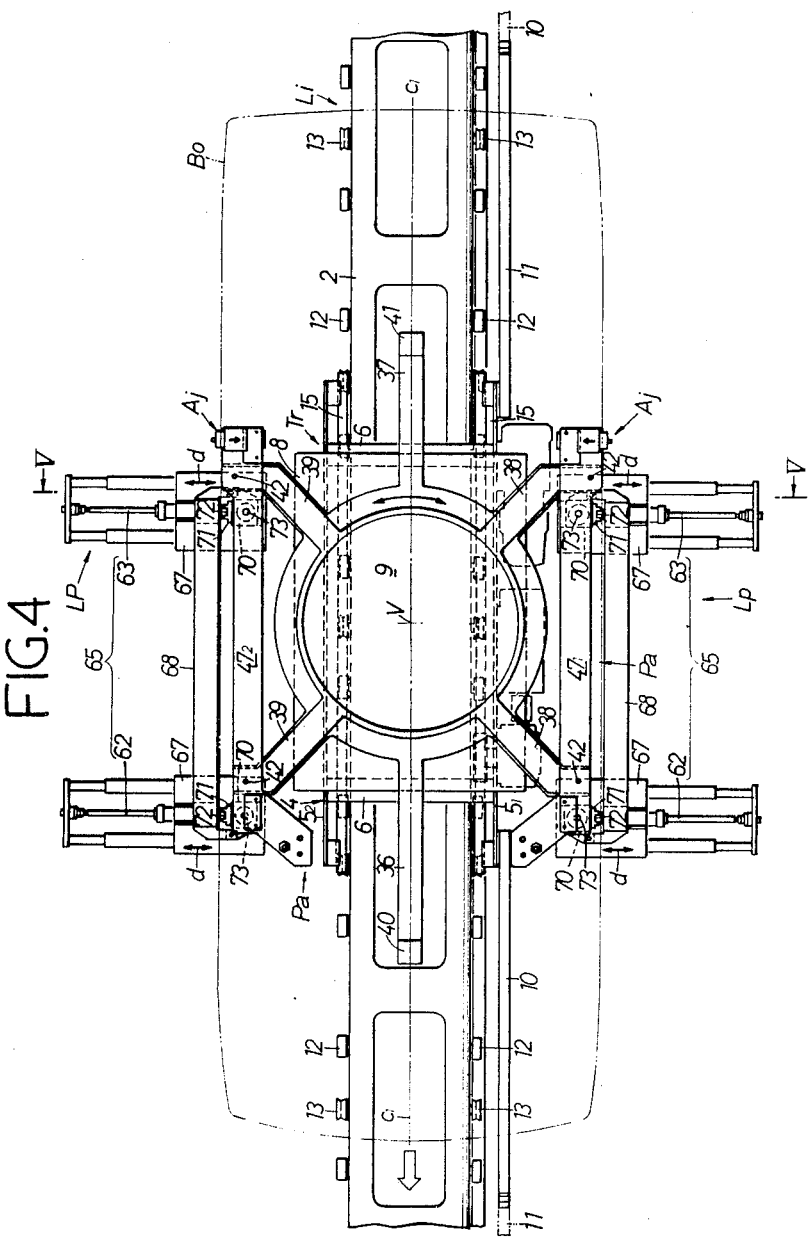
Figure 5:
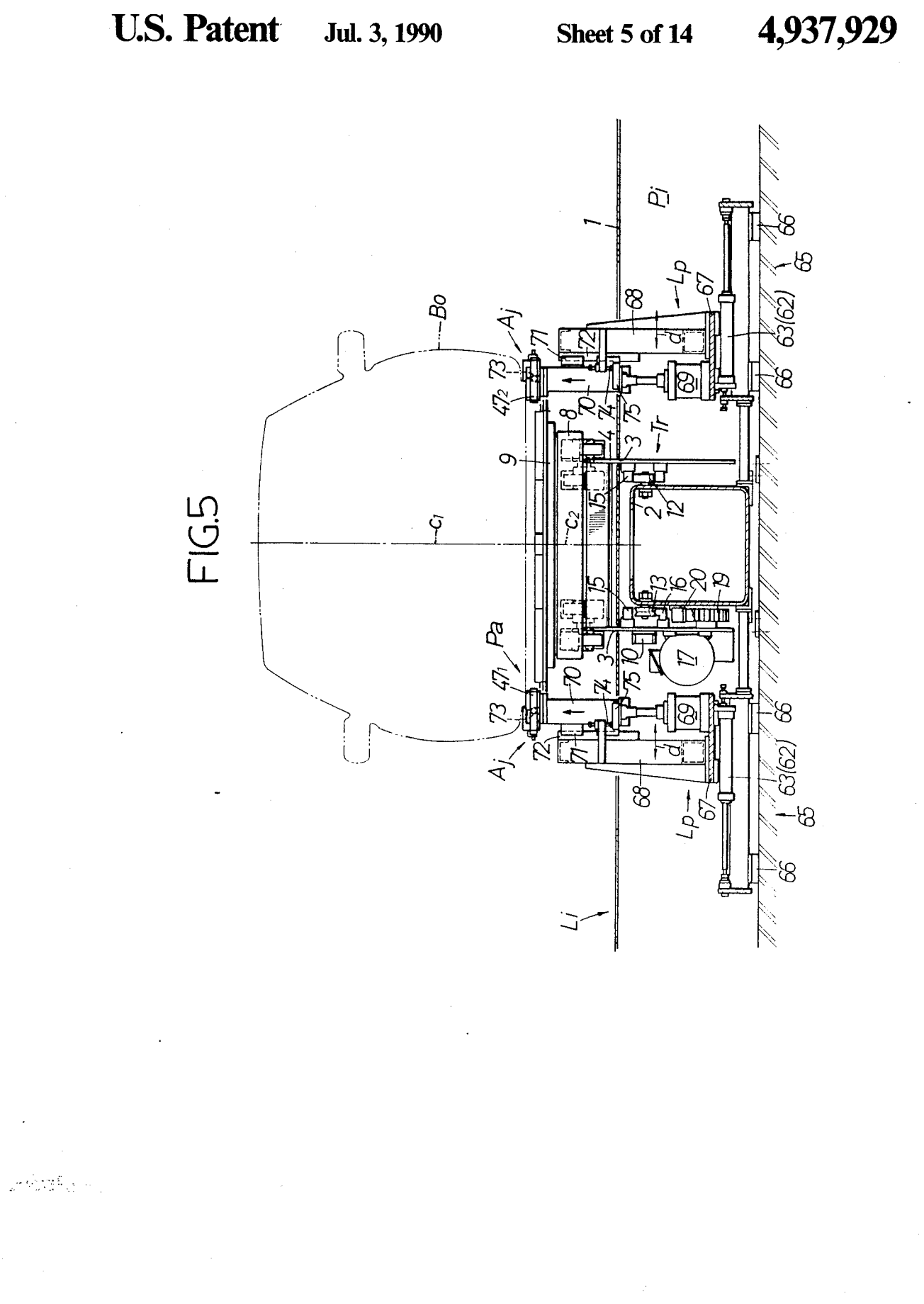
Figure 9:
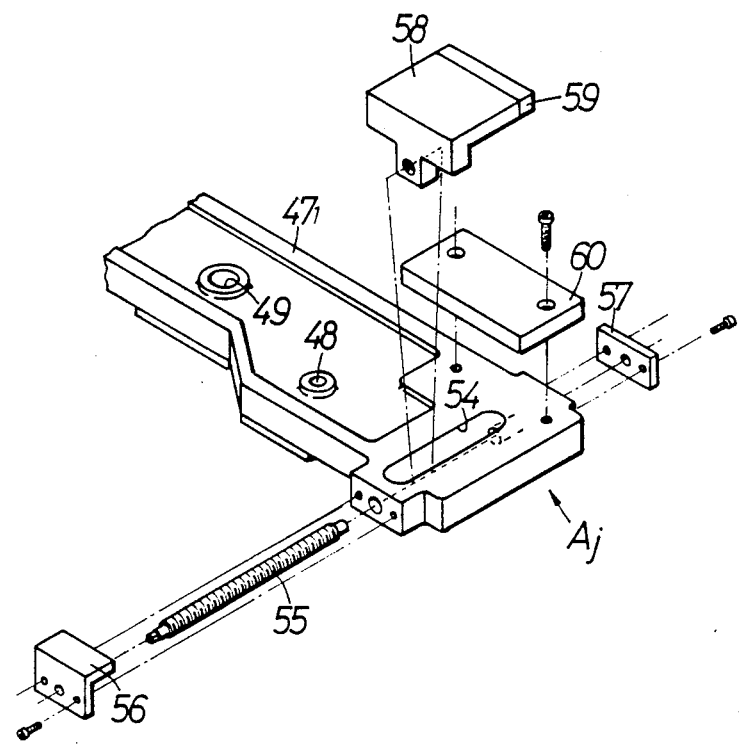

As shown in FIGS. 4 and 5, in each of the automatically assembling stations in the asembling line Li, the transporting pit Pi is increased in width, and left and right body-positioning devices Lp are installed in the transporting pit Pi at the laterally opposite sides of the transporting path 2. The left and right body-positioning devices Lp are of the same construction and hence, only one of the devices Lp will be described below with primary reference to FIGS. 4 and 5. An advancing and retreating mechanism 65 including a pair of left and right hydraulic cylinders 62, 63 is disposed at each of the front and the rear places on the bottom surface of the transporting pit Pi with base plates interposed therebetween, and a moving base 67 is mounted on each of movable portions of hydraulic cylinders 62 and 63 in the advancing and retreating mechanism 65. A portal or gate-type support frame 68 is mounted between and astride the moving bases 67, and a lift cylinder 69 is raised from each of the moving bases 67. A pillar-shaped lift member 70 is connected to an upper end of a piston rod of each of the lifting cylinders 69. Movable guide blocks 71 are secured respectively to one side of each of the lift members 70 and slidably engage with vertical guide rails 72 mounted respectively on front and rear, inner side surfaces of the portal support frame 68. Locating pins 73 are mounted in upper ends of the lift members 70 to project upwardly therefrom and adapted for removable insertion into the corresponding pallet-positioning pin holes 49 (FIGS. 6 and 7) in the pallet half $47_1$ or $47_2$) at the expansion of the lifting cylinders 69 to enable the fixing of the pallet Pa in each of the automatically assembling stations. As shown in FIG. 5, adjustable stoppers 74 are mounted on the support frame 68, while mating pieces 75 are mounted on the lift members 70 and adapted to mate with the corresponding stoppers 74, so that these components permit the raised positions of the locating pins 73 to be restricted.

The left and right body-positioning devices Lp constructed as described above can be advanced and retreated in directions indicated by an arrow d in FIGS. 4 and 5 with respect to the self-travel carriage Tr on the transporting path 2 by the operation of the advancing and retreating mechanisms 65, and are left in their retreated positions when the body Bo need not be positioned and held stationary.

Figure 10:
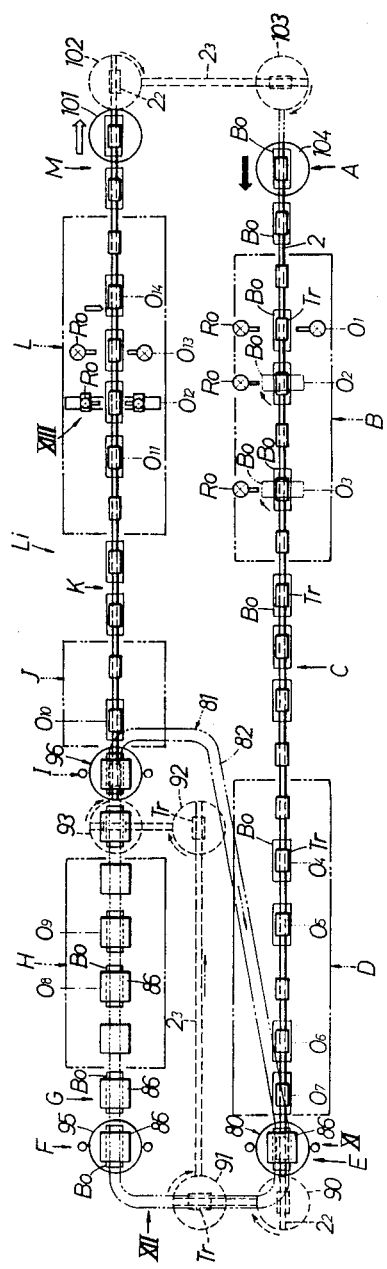

Referring to FIG. 10, there is shown an assembling line Li for assembling parts to a vehicle body by the above-described vehicle-assembling system according to the present invention.

Description will now be made of steps for assembling individual parts to the body Bo along the assembling line Li. In FIG. 10, the components on the floor plate 1 are illustrated by solid lines, and the components within the transporting pit Pi, i.e., under the ground are illustrated by dotted lines. In addition, automated assembling zones are surrounded by doubly-dotted chain lines.

(1) The travel carriage Tr travellable along the transporting path 2 is placed on a lift stand 104 (which will be described hereinafter) under the round and stopped on stand by in a starting position A. In this starting position A, the pallet Pa consisting of the pair of the pallet halves $47_1$ and $47_2$ is positioned and held on the turn rest 9, which has been lifted by the lift mechanism 7, by the engagement of the basic pins 42—in the basic-pin holes 48—. On the other hand, the body Bo which has been coated in a coating zone is transported by an overhead conveyer, and is unloaded and placed onto the pallet Pa by a hoist mounted thereon. At the placing of the body, the body-positioning pins 52 mounted at the front portion of the pallet Pa are first fitted into the pin holes h perforated in the bottom plate of the body Bo, and then, the threaded bars 55 of the pair of the body aligning mechanisms Aj (FIGS. 8 and 9) provided at the rear portion of the pallet pa are rotated and adjusted to provide the synchronously advancing movement of the sliders 58, whereby the side sill is urged and clamped at its opposite sides by the body-urging members 59 (FIG. 8). This causes the body Bo to be securely fixed on the pallet Pa with its longitudinal central axis $c1$ aligned with the longitudinal central axis $c_2$ of the self-travel carriage Tr (FIG. 3).

It should be noted that the plurality of the body-positioning pin holes 51—(FIG. 6 made in the pallet halves $47_1$ and $47_2$ is adapted for use in many types of bodies Bo of different sizes.

(2) When the body Bo is placed in an alignment manner on the pallet Pa of the self-travel carriage Tr in the starting position A described in the above step (1), the travel-drive motor 17 is driven through controlling of a current fed from the electric supply Se, so that the self-travel carriage Tr is transferred onto the transporting path 2 and caused to self-travel into a first automated assembling zone B, with the lift table 8 and the turn rest 9 above the carriage frame 4 remaining raised above the upper surface of the floor plate 1. In the first automated assembling zone B, a plurality of automated assembling stations, i.e., automated assembling stations $0_1$ to $o_3$ for conducting removal of a door, and attaching of a sunroof and a roof lining and so on are arranged in the transporting direction. In each of the automated assembling stations $0_1$, $o_2$ and $o_3$, the body-positioning devices Lp are disposed at the opposite sides of the transporting path 2, as described above The lowering of the lift mechanism 7 by the retraction of the hydraulic cylinder 27 causes the lift table s to be lowered together with the turn rest 9. This causes the locating pins 73—of the body-positioning devices Lp in the raised position to be fitted into the locating pin holes 49—in the pallet Pa, thereby positioning and fixing the body Bo on the self-travel carriage Tr through the pallet Pa (FIG. 5). The movement of the body Bo between the individual automated asembling stations $o_1$, $o_2$ and $o_3$ is provided with the lift members 70 being lowered and with the locating pins 73—of the body-positioning devices Lp being withdrawn from the locating pin holes 49—in the pallet Pa.

When the self-travel carriage Tr bearing the body Bo positioned thereon in the above manner is positioned in each of the automated assembling stations $o_1$, $o_2$ and $o_3$ in the first automated assembling zone B, individual workings such as removal of a door from the body Bo, attaching of a sunroof, attaching of a roof lining and so on are automatically carried out by a plurality of conventionally known robots Ro—arranged sideways. In the automated assembling stations $o_2$ and $o_3$ for providing the aforesaid attaching of a sunroof and a roof lining, the turn rest 9 is rotated through about 90° by the operation of the drive unit 35 to bring the body Bo into an orientation substantially perpendicular to the body-transporting direction. Even in this case, locating pins of body-positioning devices of the same structure as the above-described body-positioning devices Lp are fitted into the locating pin holes 49—in the pallet Pa to position and fix the body Bo on the turn rest 9 through the pallet Pa.

(3) The self-travel carriage Tr which has been through the automatic workings such as the aforesaid removal of the door and the attaching of the sunroof and of the roof lining advances into a first manually assembling zone C where manual assembling of body parts which is difficult to automate is conducted while continuing the self-travelling of the self-travel carriage Tr. In this case, the lift table 8 is controlled for raising movement by the lifting mechanism 7 to facilitate the manual assembling.

(4) After completion of the manual assembling in the first manually assembling zone C, the body Bo is carried into a second automated assembling zone D through travelling of the self-travel carriage Tr. In individual automated assembling stations $o_4$ to $o_7$ in he zone D, the body Bo is positioned and fixed in the stations $o_4$ to $o_7$ in the same manner as in the first automated assembling zone B by the body-positioning devices Lp, and body parts such as a radiator, a pedal bracket, a heater blower, front and rear bumpers, tail lights, an instrument panel, a body primer, inner fenders, mud guides, front and rear windows, etc., are automatically attached to the body Bo by a plurality of robots (not shown in FIG. 10).

(5) The body Bo to which the above-described body parts have been attached in the second automated assembling zone D is transported into a body-separating lift position E by the self-travel carriage Tr. In this position E, the lift table 8 has been raised by the lifting mechanism 7. For attaching bottom parts in subsequent steps, the body Bo is lifted by a drop lifter 80 and separated from the self-travel carriage Tr.

Figure 11:
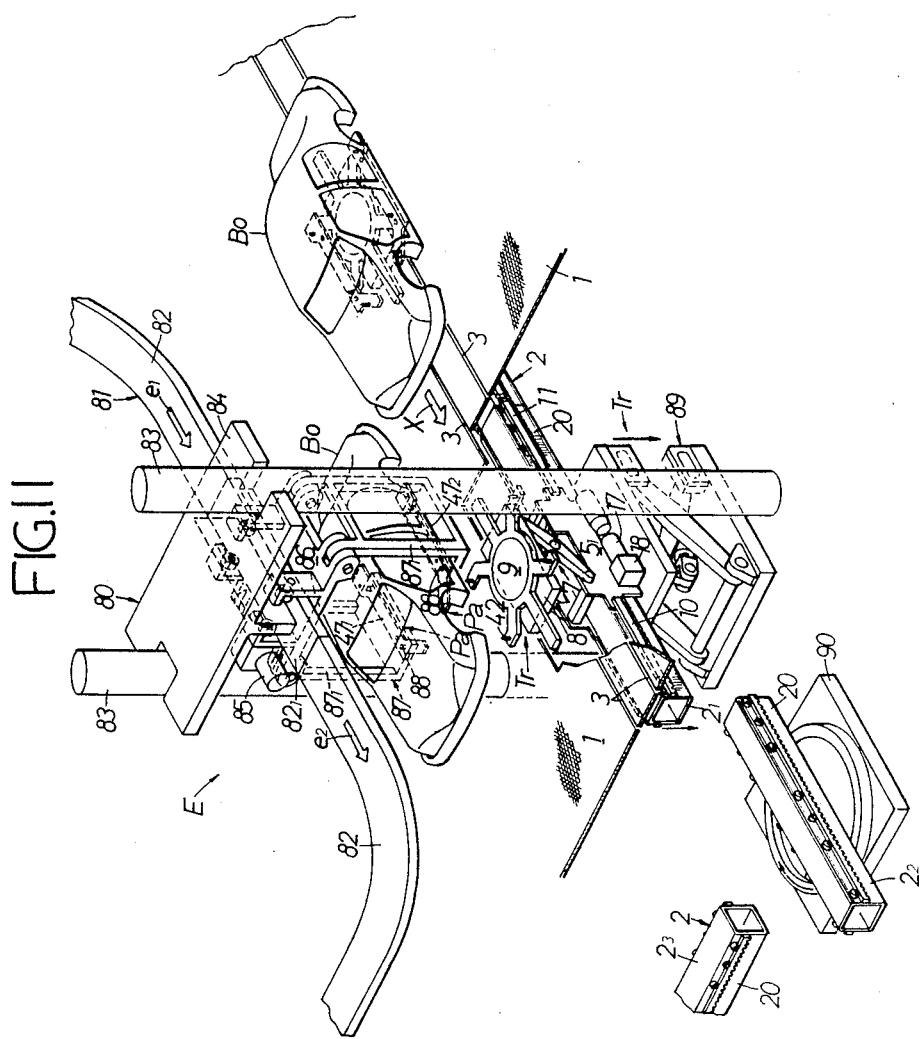

In FIG. 11, there is illustrated a perspective view of the body-separating lift position E shown in FIG. 10. The operation in the position E will be described below with primary reference to FIG. 11. In the body-separating lift position E, the drop lifter 80 is mounted astride a transporting rail 82 of an overhead conveyor 81. The drop lifter 80 includes a lift plate 84 suspended between two posts 83, and a bridging rail $82_1$ forming a part of the transporting rail 82 of the overhead conveyor 81 is hung below the lift plate 84. The bridging rail $82_1$ is continuous to the transporting rail 82 to enable the transferring of a self-travel trolley 86 which has a motor 85 and travels on the transporting rail 82. A hanger 87 having a pair of openable and closable frames $87_1$ is openably and closably hung on the trolley 86. Thus, the trolley 86 which has self-travelled on the transporting rail 82 of the overhead conveyor 81 in a direction indicated by an arrow $e_1$ in FIG. 11 is stopped when it has reached the bridging rial $82_1$ below the lift plate 84 and then, the drop lifter 80 is operated to lower the lift plate 84. Pins 88 fittable into the locating pin holes 49—in the pallet Pa are mounted on the lower portions of the openable and closable frames $87_1$ of the hanger 87 to project upwardly therefrom. The drop lifter 80 is lowered, and the body Bo is held into the openable and closable frames $87_1$ of the hanger 87 through the opening and closing thereof, so that the pins 88 on the lower end of the frame $87_1$ are inserted into the locating pin holes 49—made in the pallet Pa from the below. This permits the body Bo to be lifted with the pallet Pa by the drop lifter 80 and to be separated from the self-travel carriage Tr as shown in FIG. 11. Thereafter, if the bridging rail $82_1$ is aligned with the transporting rail 82 by raising the drop lifter 80, the travelling of the trolley 86 having the motor 85 causes the body Bo to be transported away from the drop lifter 80 in a direction indicated by an arrow $e_2$ in FIG. 11 along the transporting rail 82 into a different level transporting rail body-transferring position F (FIG. 12) of a trolley conveyor at a next step. On the other hand, the self-travel carriage Tr unloaded with the body Bo separated therefrom as shown in FIG. 11 is lowered together with a vertically-movable transporting path $2_1$ which is placed under the ground and forms a part of the transporting path 2 on a lift stand 89. The lowering of the lift stand 89 causes the vertically-movable transporting path $2_1$ to be aligned with a rotary transporting path $2_2$ on a turn table 90 placed under the round, thus transferring the self-travel carriage Tr from the vertically-movable transporting path $2_1$ onto the rotary transporting path $2_2$. Then, the rotation of the turn table 90 through about 90° causes the rotary transporting path $2_2$ to be aligned with an underground transporting path $2_3$ running under the ground, thus transferring the empty self-travel carriage Tr from the rotary transporting path $2_2$ onto the underground transporting path $2_3$. As shown by a dotted line in FIG. 10, the underground transporting path $2_3$ is laid under the ground in the form of a crank, and turn tables 91, 92 and 93 of the same structure as the above-described turn table 90 (FIG. 11) are mounted respectively at corners and an transporting-out end of the underground transporting path $2_3$. Thus, the empty self-travel carriage Tr self-travelling along the underground transporting path $2_3$ is turned three times through about 90° by the turn tables 91, 92 and 93 in the course of such self-travelling so as to self-travel in a crank form on the underground transporting path $2_3$, and is transferred again from the turn table 93 onto the transporting path 2 in a body and self-travel carriage connecting position I which ill be described hereinafter.

Figure 12:
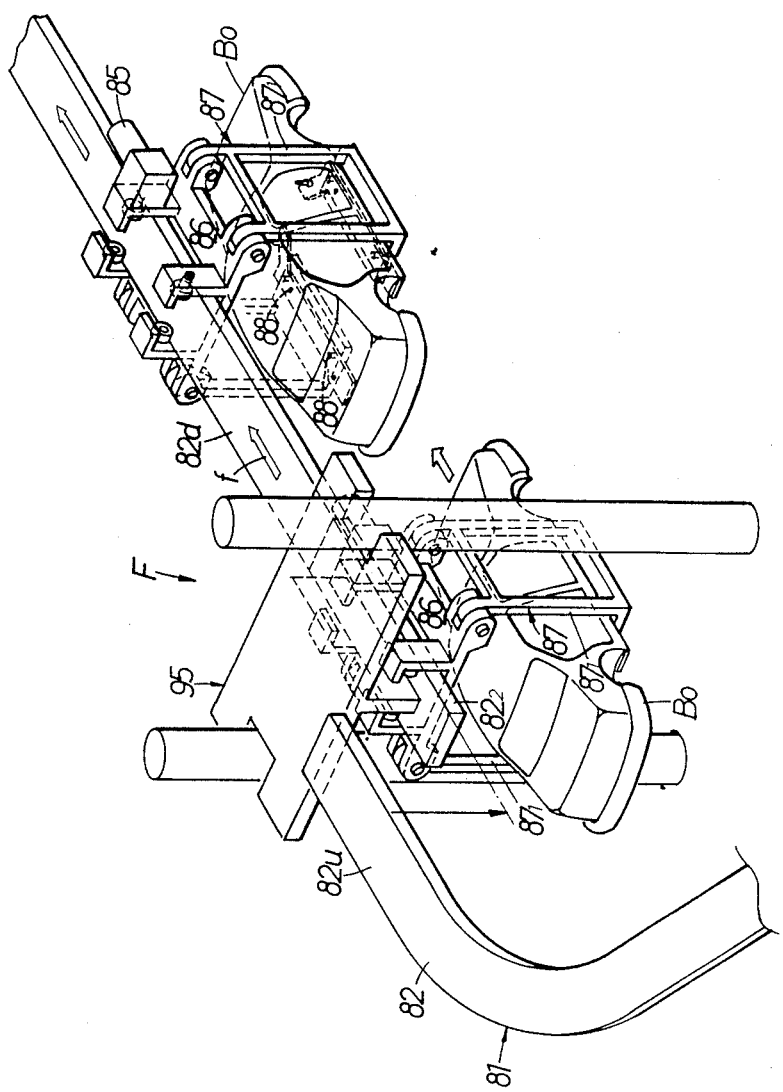

(6) The body Bo separated from the self-travel carriage Tr in the previous step reaches the different level transporting-rail body-transferring position F as remaining hung by the trolley 86 of the overhead conveyor 81. Illustrated in FIG. 12 is a perspective view of the different level transporting-rail body-transferring position F shown in FIG. 10. The operation will be described below with reference to FIG. 12. A drop lifter 95 is mounted in a stepped region of the transporting rail 82, and a transferring transport-rail $82_2$ mounted on the lifter 95 transfers the trolley 86 holding the body Bo therein from an upper transporting rail $82u$ onto a lower transporting rail $82d$. Thus, the trolley 86 travels on the lower transporting rail $82d$ in a direction indicated by an arrow f into a second manual assembling zone G for attaching bottom parts.

(7) In the second manually assembling zone G, the manual attaching of the bottom parts is conducted while the running of the body Bo is continued by the trolley 86.

(8) The body Bo carried from the second manually assembling zone G into a third automated assembling zone H as hung together with the pallet by the trolley 86 is stopped at each of automated assembling stations $o_8$ and $o_9$. Locating pins (not shown) of either positioning devices of the same structure of the above-described left and right body-positioning devices Lp or other known positioning devices provided in the stations $o_8$ and $o_9$ of are raised and fitted into the basic pin holes 48 made in the pallet Pa to position the body Bo hung by the trolley 86 together with the pallet Pa, and thus, the bottom parts, such as front and rear suspension assemblies, a fuel tank, a silencer and an exhaust pipe are attached to the body Bo according to a predetermined procedure.

(9) If the attaching of the bottom parts to the body Bo is completed, the lowering of the left and right locating devices causes the locating pins thereof to be withdrawn out of the basic pin holes 48 in the pallet Pa and then, the trolley 86 is driven to self-travel, thereby carring the body Bo into a body and self-travel carriage connecting position I together with the pallet Pa. In this position I, the body Bo is lowered, by the drop lifter 96, onto the turn rest 9 of the self-travel cariage Tr which has been passed under the ground and is on stand by, so that the basic pin holes 48 made in the pallet Pa are brought again into insertion by the basic pins 42 on the turn rest 9. Further, the body Bo is aligned and clamped by the body-aligning mechanisms Aj in such a manner that it is positioned and fixed on the turn rest 9 together with the pallet pa. Then, the self-travel carriage Tr having the body Bo positioned and supported thereon through the pallet Pa travels on the transporting path 2 into a fourth automated assembling zone J.

(10) In a station $o_{10}$ in the fourth automated assembling zone J, the Pallet Pa having the body Bo positioned thereon is positioned by the left and right body-positioning device Lp and then, workings such as attaching of a steering column and injection of a raking liquid are automatically conducted by robots (not shown). After completion of such workings, the pallet Pa is separated from the left and right positioning devices Lp and then, the self-travel carriage Tr advances into a third manually assembling zone K.

(11) In the third manually assembling zone K, assembling of parts which cannot be automated is conducted while continuing the travelling of the self-travel carriage Tr. Then, the body Bo is carried into a fifth automated assembling zone L.

(12) In the fifth automated assembling zone L, the body Bo is positioned in each of automated assembling stations $o_{11}$ to $o_{14}$ through the pallet Pa by the aforesaid body-positioning devices Lp, and workings such as attaching of tires, mounting of a spare tire and attaching of front and rear seats and of doors are conducted by a robot Ro or the like and finally, injection of gasoline into a gasoline tank is conducted.

Figure 13:
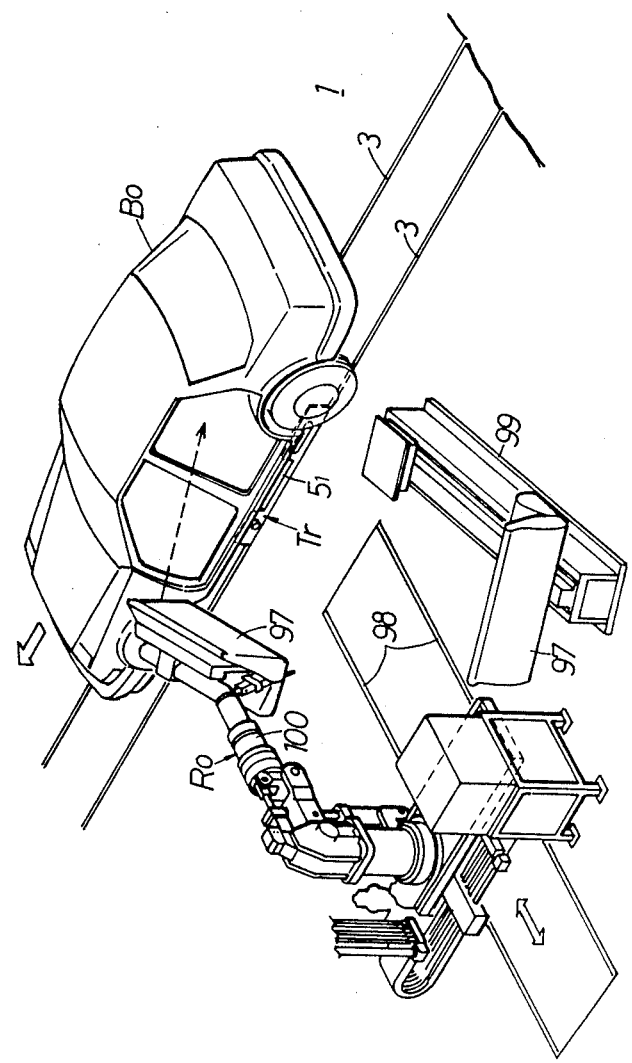
Figure 14:
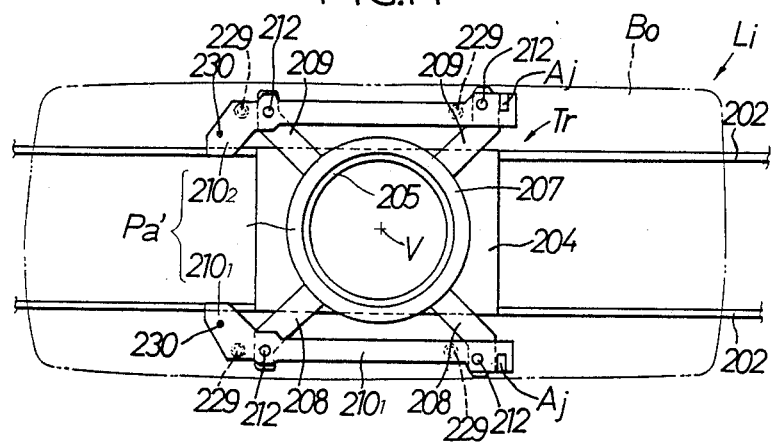
Figure 15:
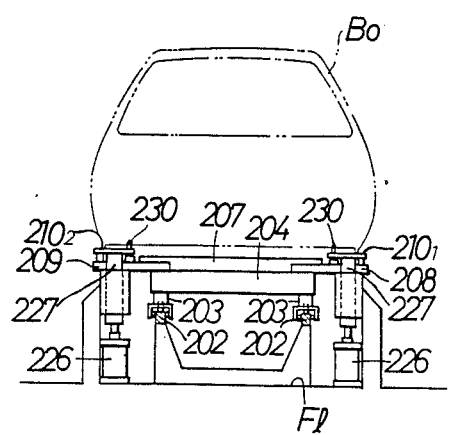

In FIG. 13, there is illustrated a mode of incorporating a rear seat 97 into the body Bo by the robot Ro used in the assembling system according to the resent invention. The robot Ro is installed for advancing nd retreating movement between a working position and a retreating position along a guide 98 in a direction perpendicular to a body Bo transporting direction, so that the rear seat 97 grasped by an arm 100 of the robot Ro is automatically incorporated into the body Bo by the advancing movement of the robot Ro and by the operation of the arm 100.

If any trouble should be generated in the robot Ro, then the robot Ro is caused to be retreated to the retreated position, so that assembling of the rear seat 97 into the body Bo can be replaced by the manually assembling operation. This makes it possible to continue the operation in the assembling line Li even with trouble being caused to the robot Ro, and also facilitates the maintenance of the robot Ro itself.

In the above manner, the hole assembling steps are completed, and the finished vehicle on the pallet Pa is carried on the transporting path 2 into a separating position M.

(13) In the separating position M, the finished vehicle is separated from the pallet Pa and carried into an inspection zone, while the self-travel carriage Tr, as having the pallet remaining placed thereon, is placed onto a lift stand 101 (identical with the lift stand 89 in FIG. 11) mounted under the ground. Then, the carriage Tr is lowered together with the vertically movable transporting path $2_1$ and placed onto a turn table 102 (identical with the turn table 90 in FIG. 11). The turning (in the clockwise direction as viewed in FIG. 10) of the turn table 102 through about 90° enables the self-travel carriage Tr to travel from the rotary transporting path $2_2$ on the underground transporting path $2_3$. Then, the self-travel carriage Tr is placed again onto a turn table 103 (identical with the turn table 90 in FIG. 11): turned further through about 90° (in the clockwise direction as viewed in FIG. 10) and placed onto a lift stand 104 (identical with the lift stand 89 in FIG. 11) in the above-described starting position A to stand by. A body Bo which has been through coating is placed again onto the self-travel carriage Tr which is on stand by, and this carriage Tr travels on the transporting path 2 into the assembling line for repeating of the above-described steps.

FIGS. 14 to 20 illustrate a second embodiment wherein the previous first embodiment is partially modified, and the parts corresponding to those of the first embodiment are designated by the like reference characters and numerals.

Figure 19:
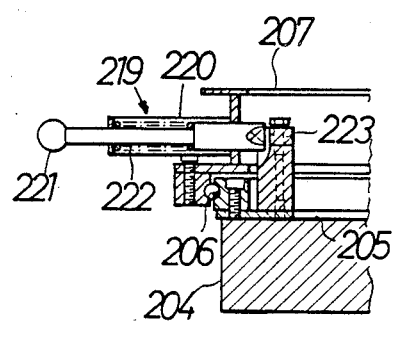

In the second embodiment, a pair of left and right parallel rails 202 as a transposting path are disposed on the working floor F along the assembling line Li. Pairs of left and right legs, i.e., totally four legs 203, 203— mounted respectively at a longitudinally spaced apart distance on a carriage Tr' to project downwardly therefrom are placed on the rails 202 through known roller means for travelling movement. Unlike the carriage in the first embodiment, the carriage Tr' has no lifting mechanism, and a substantially horizontal stationary table 204 is provided integrally on upper portions of the legs 203, 203—. An annular turn rest 207 is supported through a ball bearing 206 on an outer periphery of a guide frame 205 securely mounted on the stationary table 204, for substantially horizontally turning movement about a vertical central axis, as shown in FIG. 19.

Pairs of left and right pallet-supporting arms 208 and 209 are mounted on the left and right sides of the turn rest 207 to project substantially horizontally therefrom in radial directions, and a pair of left and right pallet halves 210 constituting a body-positioning pallet Pa' are located and supported on the support arms 208 and 209. More specifically, locating members 211— are mounted on leading ends of the left and right pallet-supporting arms 208 and 209, respectively, while engage holes 212— are provided in opposite ends the elongated rectangular pallet halves $210_1$ and $210_2$, so that the insertion of sleeves 213 of the locating members 211— into the corresponding engage holes 212 achieves the location of the pallet halves $210_1$ and $210_2$ relative to the pallet-supporting arms 208 and 209.

Figure 18:
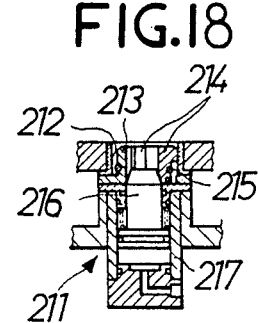

Each of the locating members 211 is comprised of a sleeve 213 circumferentially divided into three pieces as shown in FIG. 18 and adapted to be loosely fitted into the engage hole 212 from below, locating claws 214 diametrically tiltably mounted respectively in three clearances between the individual divided pieces of the sleeve 213, a resilient ring 215 wound around the locating claws 214 to clamp them from the outer peripheries thereof, a lower urging pin 216 for permitting the locating claws 214 to be diametrically opened out against a force of the resilient ring 215, and an operating cylinder 217 operable to force the urging pin 216 upwardly against a spring force. If the urging pin 216 is moved up by the operation of the operating cylinder 217 in a condition of the sleeve 213 inserted in the engage hole 212, the action of a tapered leading end of the urging pin 216 causes the locating claws 214 to be opened out into abutment against an inner peripheral surface of the engage hole 212, so that each of the pallet halves $210_1$ and $210_2$ is positioned on the carriage Tr' with the engage hole 212 aligned in the center with the sleeve 211.

Further, a plurality of bearing balls 218 located around the peripheray of each locating member 211 to support the pallet halves $210_1$ and $210_2$ for free movement are disposed on the pallet-supporting arms 208 and 209, so that the pallet halves $210_1$ and $210_2$ may be smoothly moved following the positioning of the locating member 211.

The turning movement of the turn rest 207 around the guide frame 205 through the aforesaid ball bearings 206 enables the body Bo supported on the pallet Pa' to be changed in direction.

To restrict the turning movement of the turn rest 207 around the guide frame 205, rotation-preventing means 219 is mounted as shown in FIGS. 16, 17 and 19. The rotation-preventing means 219 comprises a holding frame 220 secured to an outer peripheral surface of the turn rest 207, an operating rod 221 supported on the holding frame 220 for sliding movement in a diametrical direction of the turn rest 207, a spring contained within the holding frame 220 for biasing the operating rod 221 to project inwardly from an inner peripheral surface of the turn rest 207, and a plurality of engage members 223 arranged on an outer peripheral surface at distances circumferentially spaced apart from one another. Bringing an inner end of the operating rod 221 into engagement in a recess of the engage member 223 by the action of the spring 22 makes it possible to lock the turn rest relative to the guide frame 205 in a predetermined rotational position. On the other hand, if the operating rod 221 is withdrawn out of the recess of the engage member 223 against a force of the spring 222, the turn rest 207 can be freely rotated relative the guide frame 205.

Figure 20:
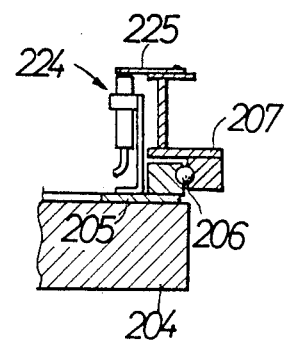

Further, as shown in FIG. 20, a rotational position detector 224 constituted of a proximity switch is mounted on the guide frame 205 for detecting the rotational position of the turn rest 207 by cooperation with a plurality of detecting pieces 225 on the turn rest 207.

Lifting cylinders 226 are raised on selected automated assembling stations in the assembling line Li, and lift members 227 are coupled to upper ends of piston rods of the lifting cylinders 226, respectively. Locating pins 228 are mounted respectively on upper ends of the lift members 227 to project upwardly therefrom and adapted to be releasably fitted into pallet locating pin holes 229 in the pallet halves $210_1$ and $210_2$. Thus, the positioning of the body Bo supported on the pallet halves $210_1$ and $210_2$ and thus on the carriage Tr' in one working station is achieved by operating the lifting cylinder 226 to raise the lift members 227 so as to fit the locating pins 226 into the corresponding pallet-locating pin holes 229 in the pallet halves $210_1$ and $210_2$ from the below.

It is noted that the reference numeral 230 designates a body-positioning pin fixedly mounted on each of the pallet halves 210and $210_2$ and adapted to be inserted into the pin holes h provided in the bottom surface of the body Bo, and the reference numeral 230 denotes a spare body-positioning pin hole into which the body-positioning pin 230 is inserted depending upon the size of the body Bo.

In the second embodiment, the transporting of the body Bo in the assembling line Li is carried out by placing and positioning the body Bo on the carriage Tr' with the pallet Pa interposed therebetween and driving the carriage Tr' to travel along the rails 202. In subjecting the body Bo to a working in a selected working station by use of an automatic machine such as a robot, such working is conducted after the lifting cylinder 226 is operated to fit the locating pin 228 into the pallet-positioning pin hole 229 so as to position the body Bo relative to the automatic machine. When the body Bo is to be shifted to overhead type transporting means such as a hanger, it is transferred from the carriage Tr' onto the overhead type transporting means while being positioned by the positioning means.

What is claimed is:

1. A method for transporting vehicle bodies by use of a plurality of transporting means in a vehicle assembling line, comprising the steps of:
    placing a vehicle body onto a pallet in a relatively positioned manner; and
    transporting said body sequentially on each of said plurality of transporting means in a manner positioned relative to each transporting means through interposition of the pallet, while transferring said body from one transporting means onto another transporting means together with said pallet.

2. A method for transporting vehicle bodies according to claim 1, wherein said vehicle assembling line includes an automatic machine in a selected assembling position, and positioning of said body relative to said automatic machine in said selected assembling position is carried out through said pallet.

3. An apparatus for transporting vehicle bodies, comprising:
    a pallet which is constructed to be capable of being mounted in a relatively located relation to a plurality of transporting means disposed in a vehicle assembling line and which is adapted to be loaded with a vehicle body thereon; and
    means provided on the pallet and in the body for positioning the body and the pallet relative to each other, said positioning means comprising a plurality of engaging means provided on the pallet and selectively used in response to a plurality of vehicle body types.

4. An apparatus for transporting vehicle bodies, comprising:
    a pallet which is constructed to be capable of being mounted in a relatively located relation to a plurality of transporting means disposed in a vehicle assembling line and which is adapted to be loaded with a vehicle body thereon; and
    means provided on the pallet and in the body for positioning the body and the pallet relative to each other comprising a plurality of engaging means provided on the pallet and selectively used in response to a plurality of vehicle body types,
    said pallet including a pair of pallet halves and said positioning means including a pin hole perforated in one of said pallet halves and said body, and a body-positioning pin on the other of said pallet halves and said body and adapted to be inserted into said pin hole.

5. An apparatus for transporting vehicle bodies according to claim 4, wherein said body-positioning pin is fixed in one of a plurality of body-positioning pin holes perforated in each of said pallet halves.

6. An apparatus for transporting vehicle bodies according to claim 5, further including a transporting path and a self-travel carriage self-travellable on said transporting path, said pallet being loaded on said self-travel carriage in a positioned manner.

7. An apparatus for transporting vehicle bodies according to claim 4, further including a transporting path and a self-travel carriage self-travellable on said transporting path, said pallet being loaded on said self-travel carriage in a positioned manner.

8. An apparatus for transporting vehicle bodies according to claim 7, wherein said positioning means includes a body-aligning mechanism for aligning a longitudinal central axis of said self-travel carriage and a longitudinal central axis of said body with each other.

9. An apparatus for transporting vehicle bodies according to claim 7, wherein positioning of said pallet and said self-travel carriage relative to each other is provided by basic pins fixedly mounted on one of said pallet and said self-travel carriage and basic pin holes perforated in the other of said pallet and said self-travel carriage, said basic pins being removably inserted into said basic pin holes, respectively.

10. An apparatus for transporting vehicle bodies, comprising:
    a pit concavely provided in a working floor;
    a transporting path laid within said pit;
    a self-travel carriage and self-travellable on said transporting path; and
    a floor path covering an upper opened face of said pit and having slits opened therein along said transporting path, wherein said self-travel carriage is travellably supported on the transporting path and comprises a carriage frame having an upper portion projecting above the floor plate through the slits, travel-drive means mounted between said carriage frame and said transporting path for driving said carriage frame to travel along said transporting path, a lift table liftably supported on the upper portion of the carriage frame, and a turn rest turnably supported on said lift table for supporting a vehicle body thereon.

11. An apparatus for transporting vehicle bodies according to claim 10, wherein said travel-drive means comprises a travel-drive motor mounted on said carriage frame in said pit, a pinion driven by said motor and meshed with a rack mounted on said transporting path, a plurality of rollable rollers arranged in a row on said transporting path in a transporting direction thereof, and travel rails mounted on said carriage frame for travelling movement on said rollable rollers.

12. An apparatus for transporting vehicle bodies according to claim 10, wherein support arms for supporting said vehicle body through a pallet are integrally provided on said turn rest.

13. An apparatus for transporting vehicle bodies according to claim 12, wherein a basic pin is mounted on each said support arm to project therefrom, and a basic pin hole adapted to be removably inserted by said basic pin is perforated in said pallet.

14. An apparatus for transporting vehicle bodies, comprising:
a pit concavely provided in a working floor;
a transporting path laid within said pit;
a self-travel carriage self-travellable on said transporting path;
a floor path covering an upper opened face of said pit and having slits opened therein along said transporting path, wherein said self-travel carriage is travellably supported on the transporting path and includes a carriage frame having an upper portion projecting above the floor plate through the slits, travel-drive means mounted between said carriage frame and said transporting path for driving said carriage frame to travel along said transporting path, a lift table liftably supported on the upper portion of the carriage frame, and a turn rest turnably supported on said lift table for supporting a vehicle body thereon, including a lifting mechanism wherein driving units are provided for raising and lowering said lift table and driving units for the lift table and the turn rest are mounted on the carriage frame within said pit.

15. An apparatus for transporting vehicle bodies according to claim 14, wherein said lifting mechanism comprises a bendable cross-link mounted between said lift table and said turn rest, a lifting cylinder for operating said cross-link, and a lock mechanism mounted between said cross-link and said carriage frame for locking said cross-link in a proper stretched position.

16. A vehicle assembling system comprising:
a transporting path disposed substantially along an assembling line from a starting point thereof to a terminal point thereof;
an automated assembling zone and a manually assembling zone coexistently disposed along said assembling line;
an automatic machine disposed in each of automated assembling stations in said automated assembling zone for advancing and retreating movement;
a self-travel carriage self-travellable along said transporting path and including a liftable and rotatable turn rest;
a pallet releasably connected on said turn rest and adapted to support a vehicle body on an upper surface thereof in an integrally positioned manner;
body-positioning means for positioning and fixing said self-travel carriage at each of the automated assembling stations together with the pallet; and
an overhead conveyor mounted on said assembling line for transporting the body separated from the self-travel carriage in a hung manner together with the pallet over a partial section of said assembling line.

17. A vehicle assembling system according to claim 16, wherein said self-travel carriage comprises a carriage frame travellably laid on said transporting path, a lift table liftably supported on said carriage frame with a lifting mechanism interposed therebetween, and a turn rest supported on said lift table for turning movement about a vertical axis, with a plurality of basic pins being mounted on said turn rest for releasably positioning and fixing said pallet having the body positioned and supported thereon.

18. A vehicle assembling system according to claim 16, wherein said pallet comprises a pair of pallet halves releasably positioned and fixed on the turn rest on said self-travel carriage travellable along said transporting path, said pallet halves having body-positioning pins mounted respectively on one ends thereof and adapted to be releasably inserted into pin holes perforated in a bottom surface of said body, and body-aligning mechanisms mounted respectively on the other ends thereof for aligning a longitudinal central axis of said self-travel carriage with a longitudinal central axis of said body in cooperation with said body-positioning pins by urging and clamping opposite sides at the bottom of the body on said turn rest.

19. A vehicle assembling system according to claim 18, wherein said pallet has further pin holes provided therein and adapted to be engaged by pins formed on a hanger of said overhead conveyor in a condition where said pallet is positioned and fixed on said self-travel carriage.

20. An apparatus for transporting vehicle bodies, comprising:
a transporting path;
a self-travel carriage which is self-travellable along said transporting path and which is equipped with a lift means for liftably carrying thereon a vehicle body and a pallet detachably mounted on the lift means for determining a position of said vehicle body relative to said lift means;
wherein said self-travel carriage travels along the transporting path selectively between a running mode wherein the carriage runs continuously on the path and a running mode wherein the carriage is stopped on the path intermittently between running operations.

21. An apparatus for transporting vehicle bodies according to claim 20, wherein said transporting path is disposed in a pit provided concavely below a working floor surface and a plurality of rollers are arranged on the transporting path, said rollers being engageable with rail means equipped on said self-travel carriage for guiding travelling of the carriage along the path, the self-travel carriage having a pinion operatively connected to a drive source on the carriage, said pinion being meshed with a rack provided on the transporting path.

* * * * *

UNITED STATES PATENT AND TRADEMARK OFFICE
CERTIFICATE OF CORRECTION

PATENT NO. : 4,937,929
DATED : July 3, 1990
INVENTOR(S) : KUNIO NOKAJIMA et al.

It is certified that error appears in the above-identified patent and that said Letters Patent is hereby corrected as shown below:

In claim 10 (column 16, line 56), delete "path" and insert therefor -- plate --.

Signed and Sealed this

Twenty-first Day of April, 1992

Attest:

HARRY F. MANBECK, JR.

*Attesting Officer*          *Commissioner of Patents and Trademarks*